(12) United States Patent
Hsieh et al.

(10) Patent No.: US 10,015,261 B2
(45) Date of Patent: Jul. 3, 2018

(54) METHOD AND TERMINAL FOR CONTROLLING INTERNET OF THINGS AND CONTROLLED ELECTRONIC DEVICE

(71) Applicant: 1MORE INC., Shenzhen (CN)

(72) Inventors: Kuanhong Hsieh, Shenzhen (CN); Boqing Lin, Shenzhen (CN); Yang Yuan, Shenzhen (CN); Shixuan Yu, Shenzhen (CN)

(73) Assignee: 1MORE INC., Shenzhen (CN)

(*) Notice: Subject to any disclaimer, the term of this patent is extended or adjusted under 35 U.S.C. 154(b) by 53 days.

(21) Appl. No.: 14/425,311

(22) PCT Filed: Nov. 11, 2014

(86) PCT No.: PCT/CN2014/090840
§ 371 (c)(1),
(2) Date: Nov. 13, 2015

(87) PCT Pub. No.: WO2015/106595
PCT Pub. Date: Jul. 23, 2015

(65) Prior Publication Data
US 2016/0100014 A1    Apr. 7, 2016

(30) Foreign Application Priority Data
Jan. 16, 2014 (CN) .......................... 2014 1 0021089

(51) Int. Cl.
*G06F 15/16* (2006.01)
*H04L 29/08* (2006.01)
(Continued)

(52) U.S. Cl.
CPC ........ *H04L 67/125* (2013.01); *G06F 3/04847* (2013.01); *H04W 76/02* (2013.01); *H04L 67/36* (2013.01)

(58) Field of Classification Search
CPC ... H04L 67/125; H04L 67/36; G06F 3/04847; H04W 76/02
(Continued)

(56) References Cited

U.S. PATENT DOCUMENTS

2002/0078161 A1* 6/2002 Cheng ................. H04L 12/2803
709/208
2012/0197977 A1* 8/2012 Nagasaka ............... H04L 67/34
709/203
(Continued)

FOREIGN PATENT DOCUMENTS

| CN | 101814227 | 8/2010 |
|---|---|---|
| CN | 102419900 | 4/2012 |

(Continued)

*Primary Examiner* — Wing F Chan
*Assistant Examiner* — Joseph Maniwang
(74) *Attorney, Agent, or Firm* — Lewis Kohn & Walker LLP; David M. Kohn; Kari Moyer-Henry

(57) ABSTRACT

A method for controlling an internet of things comprises: displaying, by a terminal, an interactive page of a controlled device, wherein the interactive page includes an interface interaction element configured to control the controlled device, and the controlled device is assigned a unique communication number; obtaining, by the terminal, a control command inputted by a user via the interface interaction element for controlling the controlled device, wherein the control command comprises the unique communication number; and sending, by the terminal, the control command to the controlled device in accordance with the unique communication number.

6 Claims, 8 Drawing Sheets

(51) Int. Cl.
*G06F 3/0484* (2013.01)
*H04W 76/02* (2009.01)

(58) Field of Classification Search
USPC .......................................................... 709/208
See application file for complete search history.

(56) References Cited

U.S. PATENT DOCUMENTS

2014/0121786 A1* 5/2014 Chen ...................... G05B 15/02
 700/19
2015/0126126 A1* 5/2015 Lee ...................... H04L 12/2816
 455/41.3

FOREIGN PATENT DOCUMENTS

| CN | 103051694 | 4/2013 |
| CN | 03079021 | 5/2013 |
| CN | 103795785 | 5/2014 |

* cited by examiner

METHOD AND TERMINAL FOR CONTROLLING INTERNET OF THINGS AND CONTROLLED ELECTRONIC DEVICE

FIELD OF THE INVENTION

The present disclosure relates to a field of the internet of things technology, and more particularly relates to a method and a terminal for controlling an internet of things and a controlled electronic device.

BACKGROUND OF THE INVENTION

Due to the development of internet technology, sensor technology, radio frequency identification technology and software technology, various devices in the physical world can be connected to an information technology basic setting, thereby forming an internet of things. The internet of things is a network concept based on the internet, and extends and expands clients of the internet to any goods or items to perform information exchanging and communication between the clients.

A conventional method for controlling the internet of things usually requires different hardware supports to control different kinds of devices. It may even be necessary to set up appropriative data collecting and transmitting devices corresponding to different application situations in accordance with different types of data transmitting modes, causing a complex implement and a cost thereof is relatively high.

SUMMARY OF THE INVENTION

Accordingly, it is necessary to provide a simple and economic method and a terminal for controlling an internet of things.

A method for controlling an internet of things includes: displaying, by a terminal, an interactive page of a controlled device, wherein the interactive page includes an interface interaction element configured to control the controlled device, and the controlled device is assigned a unique communication number; obtaining, by the terminal, a control command inputted by a user via the interface interaction element for controlling the controlled device, wherein the control command includes the communication number corresponding to the controlled device; and sending, by the terminal, the control command to the controlled device corresponding to the communication number in accordance with the communication number.

A terminal includes: a page displaying module, configured to display an interactive page of a controlled device, wherein the interactive page includes an interface interaction element configured to control the controlled device, and the controlled device is assigned a unique communication number; a command obtaining module, configured to obtain a control command inputted by a user via the interface interaction element for controlling the controlled device; and a command sending module, configured to send the control command to the controlled device corresponding to the communication number in accordance with the communication number.

Additionally, it is also necessary to provide a controlled device corresponding to the terminal.

A controlled device includes: a chip storing a unique communication number for communicating with a terminal. The chip includes: a connection establishing module, configured to send the communication number to the terminal, and establishes a connection with the terminal; a command receiving module, configured to receive a control command sent from the terminal in accordance with the communication number; and a control module, configured to control the controlled electronic device to execute the control command.

According to the method and the terminal for controlling an internet of things and the controlled electronic device in the present disclosure, a user can use the interactive page on the terminal to send control command to the controlled device. Since the control command carries the unique communication number corresponding to the controlled device, the terminal can send the control command to the corresponding controlled device, so as to implement controls of different controlled devices. Comparing to the prior art, the present disclosure is more easy to implement, and more economic for it needs no appropriative hardware device corresponding to different kinds of controlled devices.

DETAILED DESCRIPTION OF THE EMBODIMENTS

Figure 1:
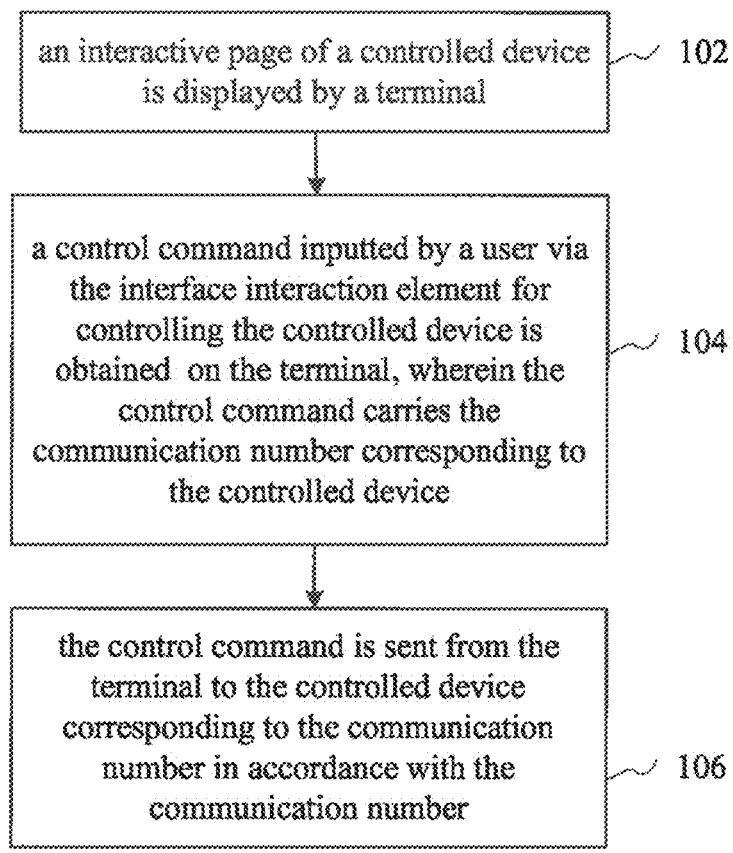
FIG. 1 is a flow chart of a method for controlling an internet of things in accordance with an embodiment.

Embodiments of the disclosure are described more fully hereinafter with reference to the accompanying drawings. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Elements that are identified using the same or similar reference characters refer to the same or similar elements.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Referring to FIG. 1, in an embodiment, the present disclosure provides a method for controlling an internet of things, and the method includes the following steps:

Step 102, an interactive page of a controlled device is displayed by a terminal.

The terminals described in the embodiments of the present disclosure include but not limited to various desktop computers, laptops, personal digital assistants, tablet computers and smart phones, etc. The controlled device corresponds to a unique communication number, that is the controlled device is assigned a unique communication number, which means there is a one-to-one correspondence between the controlled device and the communication number, thus, the controlled device can be uniquely identified in accordance with the unique communication number.

The unique communication number can be previously written in a chip of the controlled device. The communication number includes but not limited to a mobile contact number, an instant messaging number and a network application account having uniqueness, or a unique communication number generated by previously combining such numbers with a preset random character string.

The interactive interface includes an interface interaction element configured to control the controlled device, such as a button, a menu option and so on. Since the controlled device corresponds to the unique communication number, the interactive interface of the controlled device is also corresponding to the communication number.

Step 104, a control command inputted by a user via the interface interaction element for controlling the controlled device is obtained on the terminal, wherein the control command carries the communication number corresponding to the controlled device.

Different controlled devices have different interactive interfaces, thus for different controlled devices, the terminal receives different control commands inputted by the user via the interface interaction element. Since each control command carries a communication number corresponding to a controlled device, such that the terminal can send the control command to the controlled device.

Step 106, the control command is sent from the terminal to the controlled device corresponding to the communication number in accordance with the communication number.

If the terminal is directly connected to the controlled device, the terminal can directly send the control command to the controlled device; and if the terminal and the controlled device are both connected to the network, the terminal can firstly send the control command to a server, and since the control command carries a communication number corresponding to a controlled device, the server can search an address of the controlled device corresponding to the communication number, and send the control command to the controlled device.

Comparing to the prior art, a control to the controlled device by the terminal can be realized with the unique commutation number, it is much more easy to implement, and no requirement for specifical hardware devices, thereby reducing a cost thereof.

In an embodiment, prior to Step 102, the method further includes a step: a connection is established between the terminal and the controlled device via short distance wireless communication, the communication number corresponding to the controlled device is obtained by the terminal, and the terminal enters the interactive page of the controlled device in accordance with the communication number. For the controlled device is assigned the unique communication number, the unique communication number corresponds to the website of the controlled device, when the terminal obtains the unique communication number, it is equal to link to the website of the controlled device, and the terminal enters the interactive page of the controlled device. In the embodiment, Step 106 includes a step: the control command is sent from the terminal to the controlled device corresponding to the communication number via short distance wireless communication.

Figure 2A:
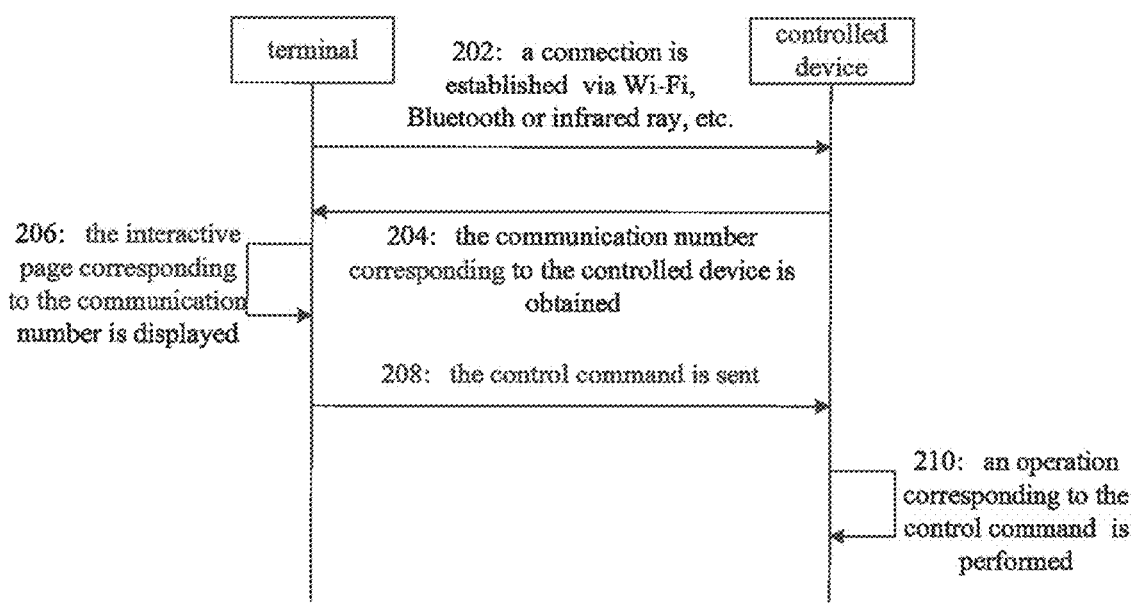
FIG. 2A is a sequence chart of the method for controlling the internet of things in accordance with the embodiment.
Figure 2B:
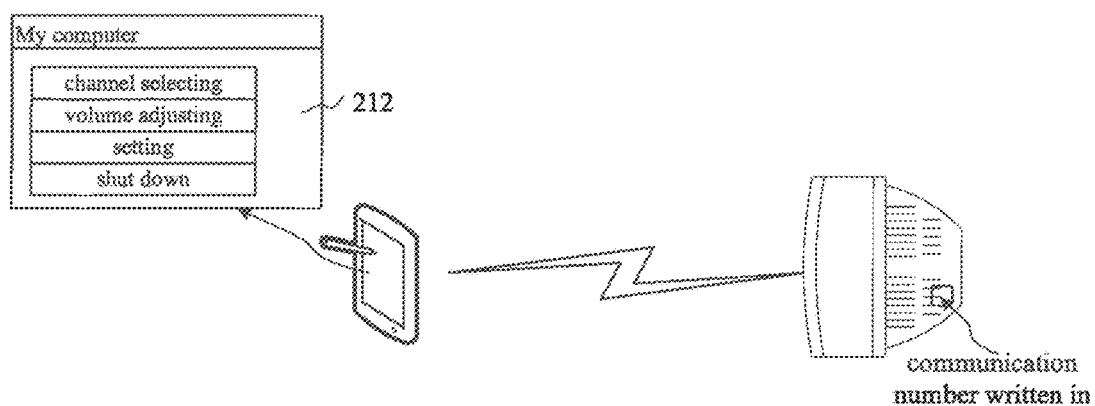
FIG. 2B is an application scene diagram of the method for controlling the internet of things shown in FIG. 2A in accordance with the embodiment.

Specifically, referring to FIG. 2A and FIG. 2B, the process of connecting the terminal to the controlled device via short distance wireless communication includes the following steps:

202: a connection is established between the terminal and the controlled device via a communication means, such as Wi-Fi, bluetooth or infrared ray, etc.

It can be understood that, the terminal can further connect with the controlled device through ZigBee or NFC (Near Field Communication), too numerous to enumerate here. In the case of Wi-Fi, both of the terminal and the controlled device can join in a same WLAN (Wireless Local Area Networks) through Wi-Fi, and the terminal can obtain the address of the controlled device in the WLAN, so as to interact with the controlled device. While in the case of Bluetooth, the terminal can pair up with the controlled device through Bluetooth, establishing a point to point connection, so as to implement the interaction.

204: the communication number corresponding to the controlled device is obtained by the terminal.

Since the communication number is previously written in the chip of the controlled device, the terminal can obtain the communication number corresponding to the controlled device after being connected to the controlled device.

206: the interactive page corresponding to the communication number is displayed on the terminal.

Besides the communication number, necessary information for generating the interactive page may also be written in the chip of the controlled device. In this case, the terminal can directly generate and display the interactive page of the controlled device after obtaining the communication number corresponding to the controlled device and the necessary information. In other embodiments, the chip of the controlled device may only store the communication number, and the terminal can obtain the necessary information in accordance with the communication number form the server after obtaining the communication number stored in the chip of the controlled device, and generate and display the interactive page of the controlled device. FIG. 2B shows an interactive page 212 of the controlled device.

The interactive page includes an interface interaction element configured to control the controlled device, such as buttons, menu options and so on. In addition, the interactive page further includes widgets for receiving information, such as text messages, voice messages, pictures or video data, inputted by the user. Therefore, the terminal can send the control command to the controlled device, as well as transmitting the information to the controlled device and outputting the information.

208: the control command is sent from the terminal to the controlled device.

Different types of control commands can be preset according to different kinds of controlled devices. Referring to FIG. 2B, the controlled device is a television, and it can receive various control commands inputted by the user through the interactive page 212. The control commands include channel selecting commands, volume adjusting commands, setting commands, or shut down commands and so on.

The terminal sends the control command inputted by the user to the control device via short distance wireless communication. In the case of Wi-Fi, since both of the terminal and the controlled device have joined in the same WLAN through Wi-Fi and established a connection, the terminal can obtain the address of the controlled device in the WLAN, and sends the control command to the controlled device in accordance with the address.

210: an operation corresponding to the control command is performed by the controlled device.

The controlled device can generate feedback information after performing the operation corresponding to the control command, and send the feedback information to the controlled device through communication means, such as Wi-Fi, Bluetooth or infrared ray, etc. The feedback information includes but not limited to voice prompt messages, prompt dialog boxes displayed in the interactive page 212 and so on.

In an embodiment, prior to Step 102, the method further includes a step: a quick response code of the controlled device is scanned by the terminal, the communication number corresponding to the controlled device is obtained by the terminal and the connection is established between the terminal and the controlled device, and the terminal can enter the interactive page of the controlled device in accordance with the communication number.

In the embodiment, the communication number corresponding to the controlled device can be previously encoded to generate the quick response code. The quick response code can be displayed on the controlled device in the form of a digital picture, as well as being printed on paper and socked on the surface of the controlled device. The terminal includes an image collecting device, such as a camera, configured to take a picture of the quick response code, and the terminal can obtain the communication number in the quick response code by decoding the quick response code with a quick response code scanning tool.

Furthermore, necessary information for generating the interactive page may also be written in the quick response code. In this case, the terminal can directly obtain the communication number and the necessary information from the quick response code, and generate the interactive page corresponding to the controlled device. In other embodiments, the communication number corresponding to the controlled device may also be directly written in the quick response code, and the terminal can obtain the necessary information in accordance with the communication number form the server, and generate the interactive page corresponding to the controlled device. Afterward, the terminal sends the control command or data to the controlled device in accordance through the interactive page.

In an embodiment, the step of sending the control command from the terminal to the controlled device corresponding to the communication number in accordance with the communication number includes a step: the control command is sent form the terminal to the server; the sever receives the control command and sends the control command to the controlled device corresponding to the communication number in accordance with the communication number.

Figure 3A:
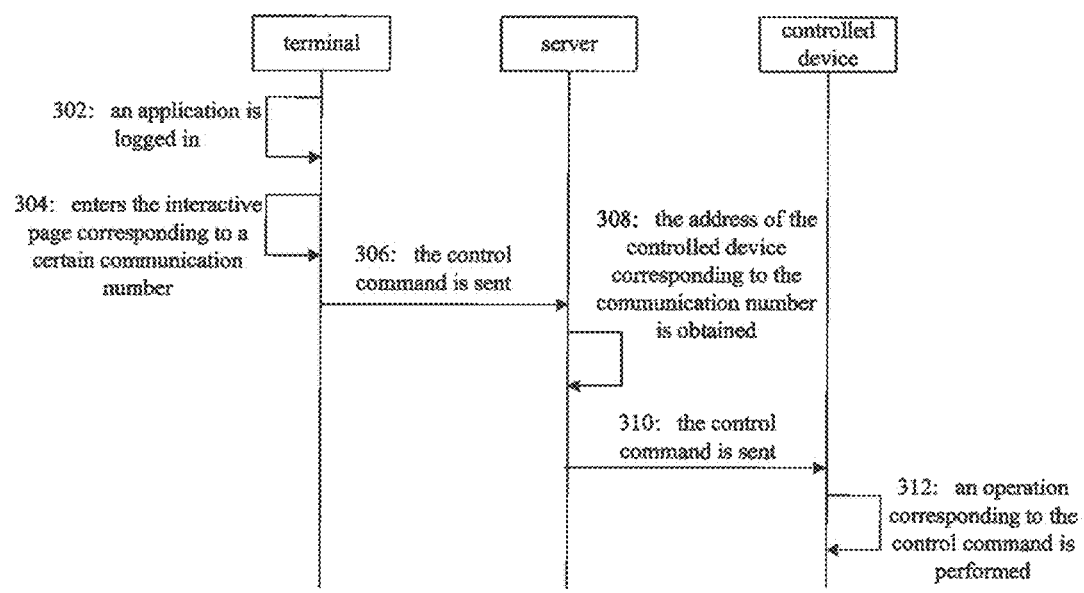
FIG. 3A is a sequence chart of the method for controlling the internet of things in accordance with another embodiment.
Figure 3B:
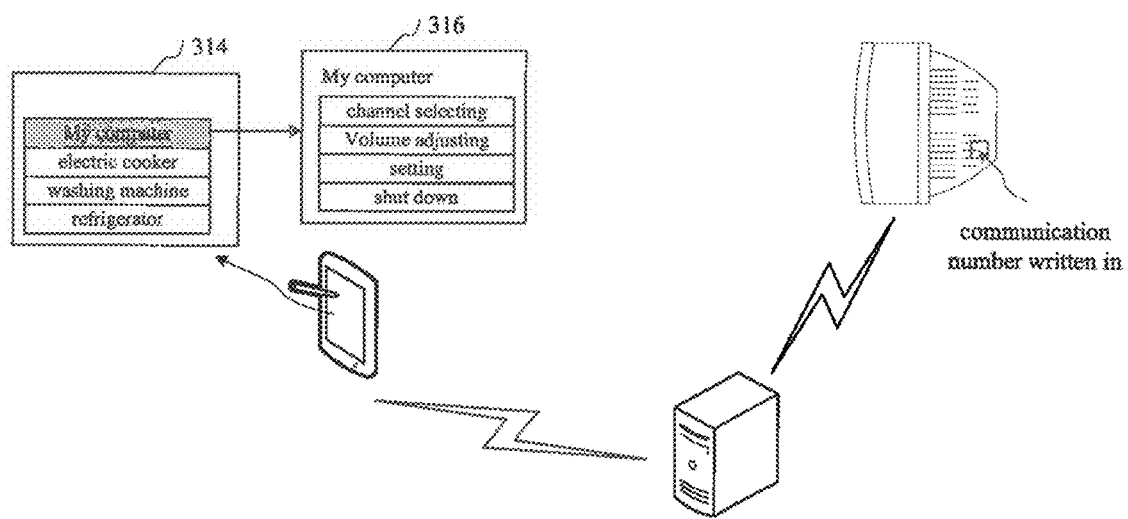
FIG. 3B is an application scene diagram of the method for controlling the internet of things shown in FIG. 3A in accordance with the embodiment.

Specifically, referring to FIG. 3A and FIG. 3B, as a preferred embodiment, the terminal can remotely control the controlled device by sending the control command through the server. The process includes the following steps:

302: an application is logged in on the the terminal.

The various controlled devices corresponding to different communication numbers can be preset on the application, since each controlled device is corresponding to a unique communication number, the controlled device on the application actually equals to another user (or a contact of the user). The Interaction between the user using the terminal and the controlled device actually equals to an interaction between the user and his contact. The application includes but not limited to a communication application, a sociality application, a game application or an application individually set for the controlled device.

The user can firstly register the application, and sets the controlled device to be administrated through the application, thus the user ID logged in the application by the user is corresponding to multiple communication numbers corresponding to the controlled devices. Referring to FIG. 3B, the terminal can enter a controlled device administration page 314 of the user after logging in the application. The controlled device administration page 314 includes all the controlled devices which the user may be able to control, and generates a contact list of the user according to the communication numbers corresponding to the controlled devices. The user can clicks an option corresponding to the controlled device to enter the interactive page 316 corresponding to the controlled device.

304: the terminal enters the interactive page corresponding to a certain communication number.

As described above, the controlled device corresponding to the communication number actually equals to a contact of the user, so the user can interact with the controlled device in accordance with the communication number.

306: the control command is sent from the terminal to the server.

308: the address of the controlled device corresponding to the communication number is obtained by the server.

The terminal obtains the control command inputted by the user via the interactive page of the controlled device, wherein the control command carries the user ID and the communication number corresponding to the controlled device. The server receives the control command, and finds out the address of the corresponding controlled device in accordance with the communication number corresponding to the controlled device, so as to send the control command to the controlled device.

310: the control command is sent from the server to the controlled device.

312: an operation corresponding to the control command is performed by the controlled device.

In the embodiment, the user can administrate and control multiple controlled devices in accordance with the unique communication numbers corresponding to the controlled devices. By virtualizing the controlled devices into the contacts of the user in the application, interaction between the user and different controlled devices is implemented, which is simple and low-cost.

In an embodiment, the step of sending the control command from the terminal to the controlled device corresponding to the communication number in accordance with the communication number includes a step: the control command is sent from the terminal to a signal converter, and the signal converter converts the control command to an infrared control signal for controlling the controlled device.

It should be made clear that the controlled devices described in the embodiments of the present disclosure includes but not limited to various devices having communication function and being able to perform operations corresponding to the control commands. An embodiment of the present disclosure takes a household appliance as a controlled device for example, intelligibly, the controlled device is not limited to a certain type of device, it may be different according to different application scenes. The communication function includes but not limited to wire communication (in which the controlled device is wired connected to the network) and wireless communication (in which the controlled device interacts with the terminal through wireless local area network, short distance wireless communication and so on).

In an embodiment, the terminal can establish a connection with the controlled device and implement the interaction in accordance with the communication number corresponding to the controlled device. Besides sending the control command to the controlled device to control the controlled device, the terminal may also be used to send data to the controlled device and outputting the information. The data may be voice messages, pictures, video data or text messages, etc. Similarly, the controlled device can collect these kinds of data and send the data to the terminal and outputting the information.

Figure 4:
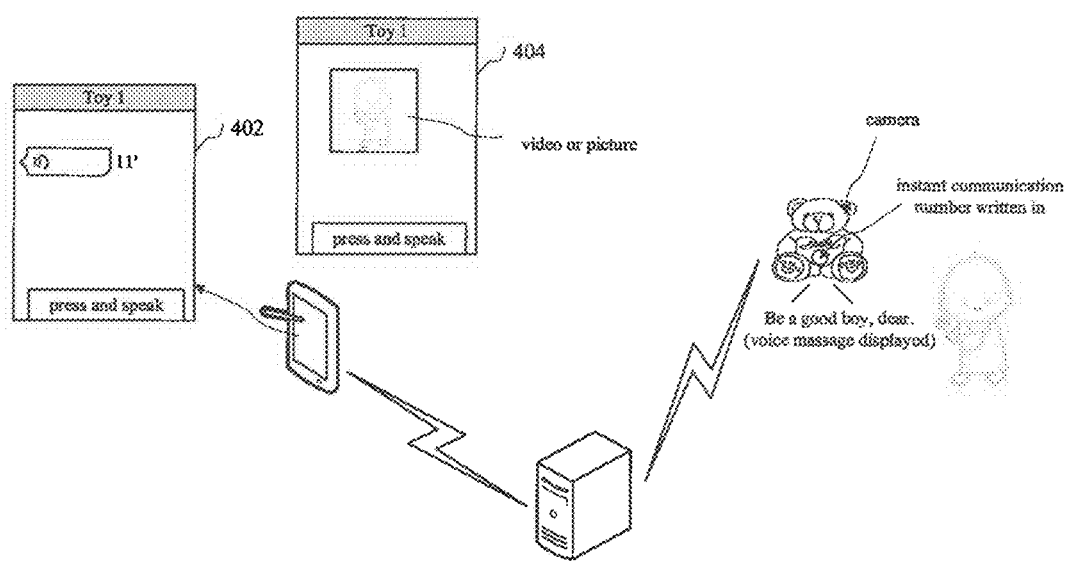
FIG. 4 is an application scene diagram of the method for controlling the internet of things in accordance with an embodiment.

As a specific embodiment, referring to FIG. 4, the controlled device is a toy (a little bear as shown in FIG. 4). The toy includes a chip therein, and a unique communication number is previously written in the chip. As shown in FIG. 4, an instant communication number as the communication number is illustrated for example, the terminal can enter the interactive page 402 of the toy in accordance with the contact list of the user (the list is used to display all the controlled devices of the user), and the user can control the toy to display voice massages, pictures or videos stored therein. Referring to the embodiments described above for detail process, specific details are not be described herein.

Furthermore, the terminal can collect a voice massage from the user, and send the voice massage together with the instant communication number corresponding to the toy to the sever. The sever can send the voice message to the toy in accordance with the instant communication number corresponding to the toy after receiving the voice message and the instant communication number corresponding to the toy. After the toy receives the voice massage, the voice massage can be saved locally, and a prompt message, such as an indicator lamp prompt or a voice prompt, can be generated. Furthermore, the toy may automatically play the voice message, or play the voice message under a certain trigger condition (such as being flapped). For the user operating the terminal, the operation actually equals to interacting with a contact. Thus, correspondingly, the toy includes a voice collecting device configured to collect voice massages and send the voice massages to the terminal. Intelligibly, the terminal may also send pictures, videos and/or text massages to the toy besides voice massages, correspondingly; the toy may also include a display device configured to display the pictures, the videos and/or the text massages, and the pictures, the videos or the text massages sent to the toy can be indicated with voice prompt information. For example, the toy can play a voice prompt "kiss" after receiving a picture of a "kiss" countenance.

Additionally, the toy may also include an image collecting device, such as a camera. The terminal can also send a control command to the toy through the interactive page 402. For example, if the control command is a shooting command, the toy can turn on the camera after receiving the shooting command, and shoot a picture or a video, and then the shot picture or the video can be sent to the terminal and be displayed on the terminal (as shown in the page 404 of FIG. 4).

Figure 5:
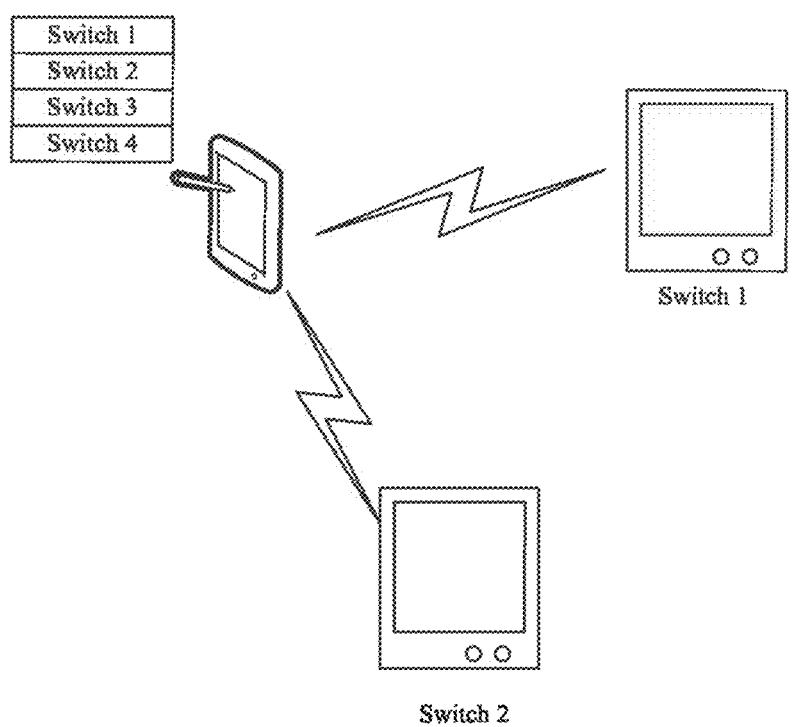
FIG. 5 is an application scene diagram of the method for controlling the internet of things in accordance with another embodiment.

In an embodiment, the terminal can control multiple controlled devices at the same time. As a specific embodiment, referring to FIG. 5, the controlled devices are switches. Multiple switches are controlled by the terminal, each switch is corresponding to a device, and the types of the devices may be different in different application scenes. In the present embodiment, the switches are applied in a application scene like a house or an office, in which each switch is corresponding to an electrical appliance or a lamp. To simplify the description, FIG. 5 only shows two switches, however, it can be understood that, the number of the switches is not limited.

Each switch is corresponding to a unique communication number, and the communication number is previously written in the chip of the switch. The terminal can obtain the communication number via short distance wireless communication or directly scanning a quick response code, and the communication number is added into the contact list of the user. In this way, by clicking a switching option in the contact list, the terminal can enter the interactive page of the switch, and receive the control command inputted by the user through the interactive page, so as to implement the control of the switch. For instance, Switch 1 is corresponding to a lamp in a bedroom; the interactive page of the Switch 1 including a button used to control the Switch 1 is displayed on the terminal, and the user can turn on or turn off the lamp in the bedroom by clicking the button.

Furthermore, in an embodiment, after a communication number corresponding to a certain controlled device is added into the contact list of the user, the terminal can further send the communication number and the WLAN address corresponding to the controlled device to other controlled devices in the contact list, enabling the controlled device to obtain the communication numbers and the addresses of the other controlled devices in the same WLAN.

The switch as the controlled device described above is illustrated for example. Multiple switches are added into the same WLAN. After obtaining a communication number corresponding to a certain switch, the terminal can send the address corresponding to the switch together with the communication number to other switches in the contact list in the WLAN while adding the communication number to the contact list of the user. If the terminal needs to control the switch, the switch is called a target switch, and the terminal can receive the control command for controlling the target switch, and detect whether the switch is in the control range or not. If so, the control command will be sent to the target switch; if not, the terminal will search another switch in the control range thereof and send the control command together with the address of the target switch to the switch in the control range, then the switch in the control range will send the control command to the target switch in accordance with the address of the target switch.

In the embodiment, the terminal can control the controlled device out of the control range thereof by transmitting the control command between different controlled devices, thereby expanding the control range for controlling the controlled devices and improving convenience for the user.

Furthermore, the switch may include a control button configured to obtain the status information of the other lamps or electrical appliances controlled by the other switches in the same WLAN, and display the status information on a screen configured on the switch. The screen on the switch may be an E-ink (electrophoretic ink) screen, a Mirasol (produced by Qualcomm MEMS Technology) screen and any such low-power screens.

The switch in the embodiment can be integrated on the device controlled by the switch, such as a lamp or an electrical appliance, or an apparatus separated from the controlled device. If the switch is a separate apparatus, it may include a built-in battery or convert kinetic energy of the user to electric energy to serve as a power for the switch. Since the switch is not necessary to be connected to alternating current, the flexibility of the switch setting position is increased.

Figure 6:
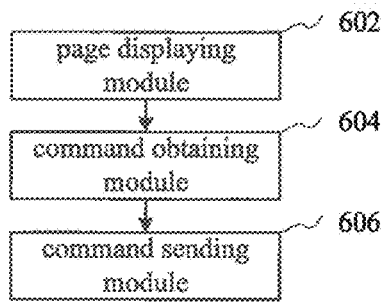
FIG. 6 is a block diagram of a terminal in accordance with an embodiment.

Referring to FIG. 6, in an embodiment, the present disclosure also provides a terminal including a page displaying module 602, a command obtaining module 604 and a command sending module 606.

The page displaying module 602 is configured to display an interactive page of a controlled device. The interactive page includes an interface interaction element configured to control the controlled device, and the controlled device has a unique communication number.

The command obtaining module 604 is configured to obtain the control command inputted by a user configured to control the controlled device via the interface interaction element.

The command sending module 606 is configured to send the control command to the controlled device corresponding to the communication number in accordance with the communication number.

Figure 7:
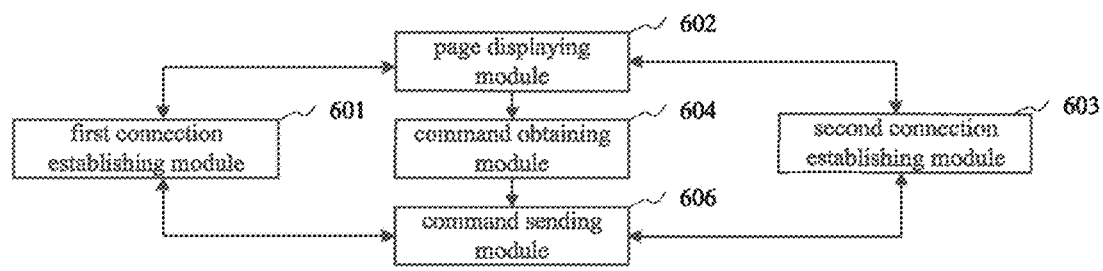
FIG. 7 is a block diagram of the terminal in accordance with another embodiment.

In an embodiment, referring to FIG. 7, the terminal further includes a first connection establishing module 601 and a second connection establishing module 603. Intelligibly, the terminal may also include any one of the first connection establishing module 601 and the second connection establishing module 603 besides the modules of the embodiment shown in FIG. 6.

The first connection establishing module 601 is configured to establish the connection between the terminal and the controlled device via short distance wireless communication, to obtain the communication number corresponding to the controlled device, and to enter the interactive page of the controlled device in accordance with the communication number. In the embodiment, the command sending module 606 is further configured to send the control command to the controlled device corresponding to the communication number via short distance wireless communication.

The second connection establishing module 603 is configured to scan a quick response code of the controlled device, to obtain the communication number corresponding to the controlled device and connect the terminal to the controlled device, and to enter the interactive page of the controlled device in accordance with the communication number.

In an embodiment, the command sending module 606 is further configured to send the control command to a server, and the control command is sent from the server to the controlled device corresponding to the communication number.

In an embodiment, the command sending module 606 is further configured to send the control command to a signal converter, the control command is converted to an infrared control signal through the signal converter, and the infrared control signal is used to control the controlled device.

Figure 8:
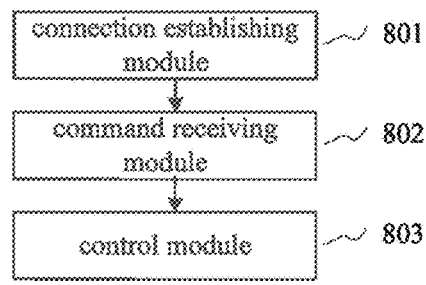
FIG. 8 is a block diagram of a controlled electronic device in accordance with an embodiment.

Referring to FIG. 8, in an embodiment, the present disclosure further provides a controlled electronic device corresponding to the terminal. In the embodiment, the controlled electronic device is an electronic toy. In other embodiments, the controlled electronic device may also be a television, an air conditioner, etc.

A chip storing the unique communication number for communicating with the terminal is configured in the controlled electronic device, that is the controlled device is assigned the unique communication number. The chip includes a connection establishing module 801, a command receiving module 802 and a control module 803.

The connection establishing module 801 is configured to send the communication number to the terminal, and establishes a connection with the terminal.

In the embodiment, the connection establishing module 801 establishes the connection with the terminal via short distance wireless communication, in other embodiments, the controlled electronic device further includes a quick response code thereon, the quick response code provides the communication number to the terminal after being scanned by the terminal, so as to establish the connection between the controlled electronic device and the terminal.

The command receiving module 802 is configured to receive a control command sent from the terminal in accordance with the communication number.

In the embodiment, the command receiving module 802 is further configured to receive the control command sent from the server or an infrared control signal.

The control module 803 is configured to control the controlled electronic device to execute the control command.

In an embodiment, the controlled electronic device farther includes a sound producing apparatus and a changeable shell. The controlled electronic device can produce different sounds by changing different shells.

In an embodiment, the controlled electronic device further includes an optical sensor configured to monitor ambient light and automatically disconnect or automatically adjust the volume of the controlled electronic device in accordance with ambient light.

According to the method and the terminal for controlling an Internet of things and the controlled electronic device in the present disclosure, a user can use the interactive page on the terminal to send control command to the controlled device. Since the control command carries the unique communication number corresponding to the controlled device, the terminal can send the control command to the corresponding controlled device, so as to implement controls of different controlled devices. Comparing to the prior art, the present disclosure is more easy to implement, and more economic for it needs no appropriative hardware device corresponding to different kinds of controlled devices.

The embodiments described above only show a few implement manners of the present disclosure, the description is specific and detailed, but it cannot be interpreted as a limitation of the range of the present disclosure. What should be pointed out is that it is apparent to those skilled in the art that a variety of modifications and changes may be made without departing from the scope of the present disclosure. Thus, the range of the present invention should be defined by the appended claims.

What is claimed is:

1. A controlled device comprising:
   a voice collecting device configured to collect voice messages and send the voice messages to a terminal;
   a chip storing a unique communication number for communicating with a terminal, wherein the chip comprises:
   a memory storing instructions; and
   at least one processor which executes the instructions stored in the memory that cause the at least one processor to:

send the unique communication number to the terminal, and establish a connection with the terminal;

receive a control command sent from the terminal in accordance with the unique communication number;

receive a control command sent from another controlled device in accordance with an address of the controlled device, when the terminal detects whether the controlled device is in a control range or not, wherein if the controlled device is not in range, the terminal searches for another controlled device in the control range, and the terminal sends the control command together with an address of the controlled device to the another controlled device; and control the controlled electronic device to execute the control command, wherein the controlled device further comprises a sound producing apparatus and a changeable shell, wherein the controlled device can produce different sounds by changing different shells.

2. The controlled device according to claim 1, wherein the connection establishing module establishes the connection with the terminal via short distance wireless communication.

3. The controlled device according to claim 1, wherein the controlled device comprises a quick response code thereon, the quick response code is configured to be scanned by the terminal, and provides the communication number to the terminal, so as to establish the connection between the controlled device and the terminal.

4. The controlled device according to claim 1, wherein the command receiving module is further configured to receive the control command sent by the server.

5. The controlled device according to claim 1, wherein the command receiving module is further configured to receive an infrared control signal.

6. The controlled device according to claim 1, wherein the controlled device further comprises an optical sensor configure to monitor ambient light and automatically disconnect or automatically adjust the volume of the controlled device in accordance with ambient light.

* * * * *

UNITED STATES PATENT AND TRADEMARK OFFICE
CERTIFICATE OF CORRECTION

PATENT NO. : 10,015,261 B2
APPLICATION NO. : 14/425311
DATED : July 3, 2018
INVENTOR(S) : Hsieh et al.

Page 1 of 1

It is certified that error appears in the above-identified patent and that said Letters Patent is hereby corrected as shown below:

In the Specification

Column 3, Line 9: insert the word --are-- after the word "but";

Column 3, Line 20: insert the word --is-- after the word "but";

Column 3, Line 58: the word "commutation" should read "communication";

Column 5, Line 19: insert the word --is-- after the word "but";

Column 5, Line 50: the word "form" should read "from";

Column 5, Line 58: the word "form" should read "from";

Column 6, Line 23: the word "clicks" should read "click";

Column 6, Line 65: insert the word --is-- after the word "but";

Column 7, Line 5: insert the word --is-- after the word "but";

Column 7, Line 33: delete the word "be";

Column 7, Line 37: both instances of the word "sever" should read "server"; and

Column 8, Line 5: delete the second instance of the word "the".

Signed and Sealed this
Twenty-eighth Day of August, 2018

Andrei Iancu
*Director of the United States Patent and Trademark Office*